United States Patent
Davis et al.

(10) Patent No.: US 9,782,918 B2
(45) Date of Patent: Oct. 10, 2017

(54) METHOD AND APPARATUS FOR MANUFACTURING A WIND TURBINE BLADE COMPONENT WITH UNIFORM TEMPERATURE CURING

(71) Applicant: Vestas Wind Systems A/S, Aarhus N. (DK)

(72) Inventors: Olav Davis, Hamble (GB); Damien Rajasingam, East Cowes (GB); Adam Fisher, Portland, OR (US); Andy Limmack, Winscombe (GB); Tomasz Garstka, Bristol (GB)

(73) Assignee: Vestas Wind Systems A/S, Aarhus N. (DK)

( * ) Notice: Subject to any disclaimer, the term of this patent is extended or adjusted under 35 U.S.C. 154(b) by 380 days.

(21) Appl. No.: 14/369,939

(22) PCT Filed: Dec. 14, 2012

(86) PCT No.: PCT/DK2012/050467
§ 371 (c)(1),
(2) Date: Jun. 30, 2014

(87) PCT Pub. No.: WO2013/097854
PCT Pub. Date: Jul. 4, 2013

(65) Prior Publication Data
US 2014/0327178 A1 Nov. 6, 2014

Related U.S. Application Data

(60) Provisional application No. 61/581,730, filed on Dec. 30, 2011.

(30) Foreign Application Priority Data

Mar. 14, 2012 (DK) .......................... PA 2012 70116

(51) Int. Cl.
*B29C 33/02* (2006.01)
*B29C 35/02* (2006.01)
(Continued)

(52) U.S. Cl.
CPC .............. *B29C 35/02* (2013.01); *B29C 33/02* (2013.01); *B29C 33/04* (2013.01);
(Continued)

(58) Field of Classification Search
CPC .............. B29C 35/002; B29C 35/0288; B29C 35/0294; B29C 33/02; B29D 99/0025; B29D 99/0028
See application file for complete search history.

(56) References Cited

U.S. PATENT DOCUMENTS

| | | | |
|---|---|---|---|
| 6,506,325 B1* | 1/2003 | Cartwright ............ | B29C 70/443 264/102 |
| 2010/0230575 A1* | 9/2010 | Mironov ................. | B29C 33/02 249/78 |
| 2011/0198013 A1* | 8/2011 | Christiansen ........... | B29C 33/02 156/64 |

FOREIGN PATENT DOCUMENTS

| CN | 201856380 U | 6/2011 |
|---|---|---|
| DE | 102004025704 A1 | 12/2005 |

(Continued)

OTHER PUBLICATIONS

International Bureau, Notification Concerning Transmittal of International Preliminary Report on Patentability, issued in corresponding International Application No. PCT/DK2012/050467, dated Jul. 1, 2014, 8 pages.

(Continued)

*Primary Examiner* — Matthew Daniels
(74) *Attorney, Agent, or Firm* — Wood Herron & Evans LLP (57) ABSTRACT

A molding apparatus for manufacturing a wind turbine blade component includes a main mold body (30) and a flexible bladder (38). The main mold body includes a shape defining surface (32) for receiving composite material forming the blade component and a heat reservoir (40) for heating the blade component during curing. The flexible bladder overlays and conforms to the shape of the blade component and is configured to receive heated liquid for heating the blade component during curing. One or both of the main mold body and the flexible bladder is divided into a plurality of zones (58, 66) that are independently controlled by a controller (70) to maintain a generally uniform temperature of the blade component at each zone.

12 Claims, 6 Drawing Sheets

(51) Int. Cl.

| | | |
|---|---|---|
| *B29C 70/44* | (2006.01) | |
| *B29C 33/04* | (2006.01) | |
| *B29C 43/36* | (2006.01) | |
| *B29D 99/00* | (2010.01) | |
| *F03D 1/06* | (2006.01) | |
| *B29L 31/08* | (2006.01) | |
| *B29L 9/00* | (2006.01) | |

(52) U.S. Cl.
CPC .......... *B29C 43/3642* (2013.01); *B29C 70/44* (2013.01); *B29D 99/0025* (2013.01); *F03D 1/0675* (2013.01); *B29C 2043/3649* (2013.01); *B29C 2791/002* (2013.01); *B29L 2009/00* (2013.01); *B29L 2031/08* (2013.01); *B29L 2031/085* (2013.01); *Y02E 10/721* (2013.01); *Y02P 70/523* (2015.11)

(56) References Cited

FOREIGN PATENT DOCUMENTS

| | | |
|---|---|---|
| DE | 102010013405 A1 | 10/2011 |
| EP | 1092529 A1 | 4/2001 |
| WO | 2007035100 A2 | 3/2007 |
| WO | 2010129496 A2 | 11/2010 |

OTHER PUBLICATIONS

International Searching Authority, International Search Report and Written Opinion issued in corresponding PCT Application No. PCT/DK2012/050467 dated Feb. 18, 2013, 14 pages.

Danish Patent and Trademark Office, Combined search and examination report issued in corresponding DK application No. PA 2012 70116 dated Oct. 25, 2012, 5 pages.

\* cited by examiner

METHOD AND APPARATUS FOR MANUFACTURING A WIND TURBINE BLADE COMPONENT WITH UNIFORM TEMPERATURE CURING

TECHNICAL FIELD

This application relates generally to wind turbines, and more particularly to a method and apparatus for manufacturing a wind turbine blade component by curing composite material with a generally uniform temperature along the entire length of the blade component.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades (e.g., three blades) mounted thereto and extending radially from the hub. Consequently, as wind forces the blades to rotate, electrical energy is produced by the generator.

Conventional wind turbine blades include an outer airfoil shell disposed about an inner spar. The outer airfoil shell is configured to provide the wind turbine blade with its aerodynamic features and characteristics (e.g., lift and drag performance) while the spar is configured to provide the strength and rigidity for supporting the loads imposed on the blade during operation. To increase the structural strength of these wind turbine blade components, the outer airfoil shell and the spar are generally formed in halves or other portions that extend along the entire length of the finished blade. Specialized molding and curing equipment is typically used to accommodate the significant lengths of these blade components, which continue to increase in length as more power is desired from larger wind turbines. For example, the outer airfoil shell may be formed in two shell halves that extend along a component length of 60 to 80 meters or longer.

Large composite structures such as these wind turbine blade components are generally manufactured using manual layup techniques. This involves arranging mats or plies of reinforcing fibrous material in large molds by hand. Several layers of fibrous material may be arranged in the mold. Alternatively, the layers or mats may be applied by automated equipment in the mold. The mats typically comprise glass or carbon fibres, for example. Once the mats have been arranged in the mold, resin is supplied to the mold using a technique such as resin transfer molding (RTM) or vacuum-assisted resin transfer molding (VARTM) or another infusion method. Alternatively, the mats may be pre-impregnated with resin, i.e. pre-preg, which dispenses with the need to supply resin to the mold. In any event, the layup is generally subjected to a vacuum-assisted and temperature-controlled consolidation and curing process.

When these blade components are formed using these processes, it is desirable to maintain a uniform temperature throughout the entire blade component during curing to avoid the formation of air bubbles in the finished blade component. Traditional methods of curing a composite material include placing the composite material inside a commercial oven or surrounding the composite material with a heating oil or other similar liquid. However, there are no standard commercial ovens available that extend over the significant component length required to form a wind turbine blade component. In addition, the size of the mold equipment renders movement of the mold into and out of a commercial oven impractical, if not impossible. Moreover, it is believed to be very difficult to maintain a uniform temperature of a unitary flow of heating oil that flows along the entire component length required when curing a blade component. Therefore, alternative methods for curing wind turbine blade components have been developed.

In this regard, current molding equipment for wind turbine blade components includes a main mold body upon which the composite material is laid before curing. When the composite material is in position, an insulating blanket is positioned over the composite material and the main mold body is heated by electric heating elements or heated air within the main mold body. As a result, the blade component is only heated from one side. With the ever-increasing size of wind turbine blades, the thickness of blade components has also increased along with the component length. Additionally, the thickness of some blade components may vary along the component length. Heating these thicker blade components from only one side can be undesirable because it is believed that it is impossible to effectively and uniformly heat entirely through the increased and/or varying thickness of larger blade components when applying heat from only one side. If the temperature of the composite material varies significantly during curing along the thickness or along the component length, the risk of capturing air bubbles in the finished blade component is increased.

Thus, there is a need for a method and associated molding apparatus for manufacturing wind turbine blade components that provide more generally uniform curing temperatures throughout the blade component.

SUMMARY

To address these and other shortcomings, a molding apparatus for manufacturing a wind turbine blade component with a component length includes a main mold body, a flexible bladder, and a controller. The main mold body includes a shape defining surface for receiving composite material forming the blade component. The main mold body is divided along the component length into a plurality of mold body zones. Each mold body zone also includes a heat reservoir configured to heat the blade component at that mold body zone. The flexible bladder is configured to overlay and conform to a shape of the blade component on the shape defining surface. The flexible bladder receives a heated liquid for heating the blade component. The controller is operatively coupled to the main mold body for independently controlling the temperature of the blade component at each mold body zone.

In one aspect, the molding apparatus further includes a first plurality of temperature sensors thermally coupled to the plurality of mold body zones for sensing the temperature of each mold body zone and communicating these temperatures to the controller. The molding apparatus may also include a fluid pump for pumping the heated fluid to vessels of the heat reservoirs, and a flow control valve associated with each of the mold body zones. The flow control valves are controlled by the controller so as to adjust a flow rate of the heated fluid received in the corresponding vessels from the fluid pump.

In another aspect, the flexible bladder is divided along the component length into a plurality of bladder zones. For example, the flexible bladder may include a unitary bladder divided into the plurality of bladder zones by a plurality of partitions within the unitary bladder. In another example, the flexible bladder includes a plurality of independent flexible bladders each defining one of the plurality of bladder zones. Furthermore, each of the plurality of bladder zones is positioned at a common location along the component length with a corresponding one of the plurality of mold body zones.

In yet another aspect, the molding apparatus further includes a second plurality of temperature sensors thermally coupled to the plurality of bladder zones for sensing the temperature of each bladder zone and communicating these temperatures to the controller. The molding apparatus may also include a liquid pump for pumping the heated liquid to each of the bladder zones, and a flow control valve associated with each of the bladder zones. The flow control valves are controlled by the controller so as to adjust a flow rate of the heated liquid received in the corresponding bladder zone from the liquid pump. In another aspect, the molding apparatus includes a liquid heater for heating the heated liquid supplied to the flexible bladder, the liquid heater being operatively coupled to the controller such that the controller operates the liquid heater to control the temperature of the heated liquid and thereby control the temperature of the blade component.

Each of the plurality of mold body zones and the flexible bladder may be heated by heating oil or a water/glycol mixture. Alternatively, each of the heat reservoirs in the mold body zones includes an electric heating device and the flexible bladder receives heating oil. The flexible bladder in this aspect may transfer heat from the heating oil and the electric heating device along the component length. The mold body zones may also be thermally isolated from one another.

In another embodiment of the invention, a method for manufacturing a wind turbine blade component having a component length includes laying composite material onto a shape defining surface of a main mold body. The main mold body is divided along the component length into a plurality of mold body zones. The method also includes positioning a flexible bladder to overlay and conform to the composite material on the shape defining surface. The composite material is cured by supplying heated liquid to the flexible bladder and by supplying heat energy from heat reservoirs located in each of the mold body zones. The method also includes controlling the temperature of the composite material at each of the mold body zones independently.

In one aspect, the method further includes sensing the temperature of each heat reservoir and controlling the heat energy supplied to each heat reservoir to maintain a generally uniform temperature across each of the mold body zones. Controlling the heat energy supplied to each heat reservoir may include modifying electrical power supplied to electrical heating devices in the heating reservoirs or modifying a flow rate of heated fluid delivered to the heating reservoirs.

In another aspect, the flexible bladder is divided along the component length into a plurality of bladder zones, and heated liquid is supplied to each of the plurality of bladder zones independently. To this end, the method may further include sensing the temperature of each bladder zone and controlling a flow rate of heated liquid supplied to each bladder zone to maintain a generally uniform temperature across each of the bladder zones. More particularly, the temperature of all mold body zones and all bladder zones may be controlled so as to be generally uniform. As a result, the temperature is maintained at a constant along the entire thickness and length of the wind turbine blade component during curing.

In another embodiment of the invention, a molding apparatus for manufacturing a wind turbine blade component with a component length includes a main mold body, a flexible bladder, and a controller. The main mold body includes a shape defining surface for receiving composite material forming the blade component. The flexible bladder is configured to overlay and conform to a shape of the blade component on the shape defining surface. The flexible bladder is divided along the component length into a plurality of bladder zones each receiving a heated liquid for heating the blade component. The controller is operatively coupled to the flexible bladder for independently controlling the temperature of the blade component at each bladder zone.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
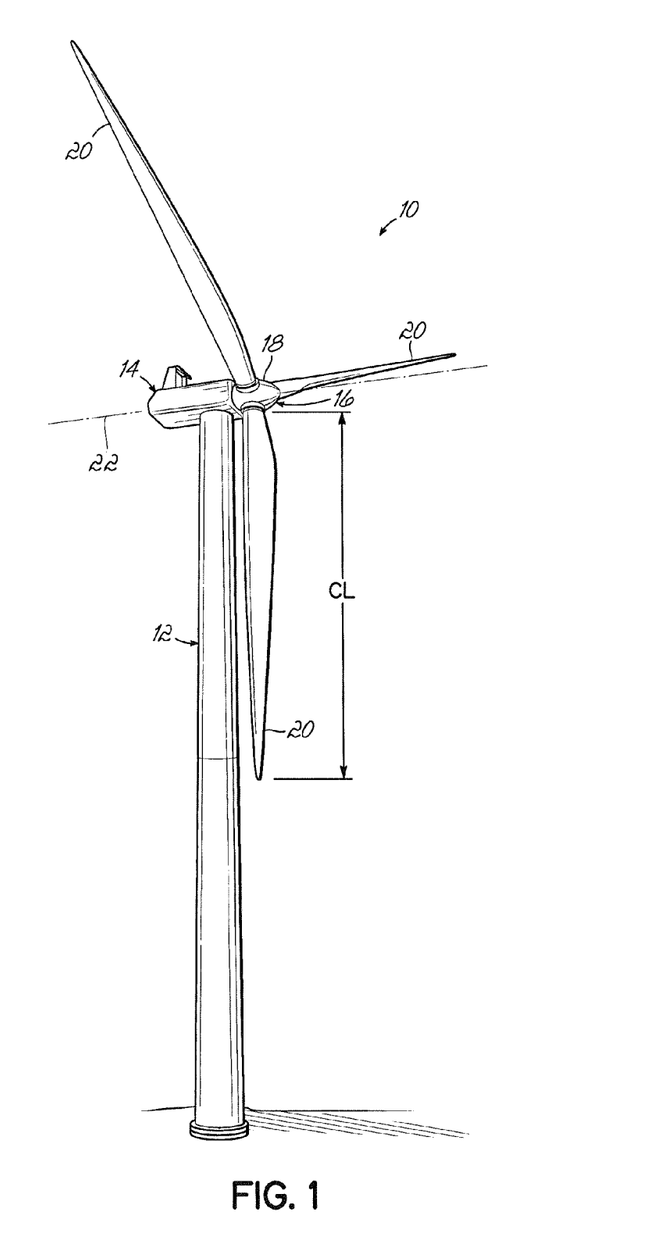
FIG. 1 is a diagrammatic view of a wind turbine including wind turbine blade components manufactured according to the method and molding apparatus of this invention.

With reference to FIG. 1 and in accordance with an embodiment of the invention, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14, and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. To this end, the rotor 16 of wind turbine 10 includes a central hub 18 and at least one wind turbine blade 20 that projects outwardly from the central hub 18. In the representative embodiment, the rotor 16 includes three blades 20 at locations circumferentially distributed thereabout, but the number may vary. The blades 20 are configured to interact with the passing air flow to produce lift that causes the central hub 18 to spin about a longitudinal axis 22. Consequently, as the wind forces the blades 20 to rotate, electrical power is generated at the generator.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
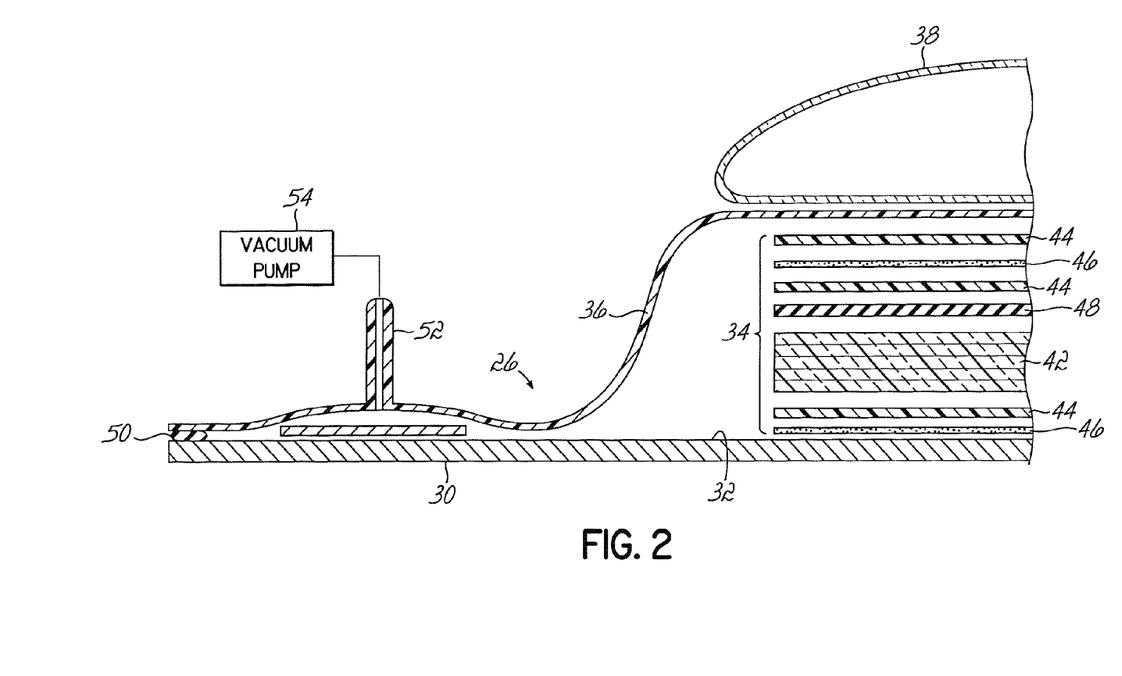
FIG. 2 is a schematic cross-sectional view of a first embodiment of the molding apparatus used to manufacture a blade component, showing operation of a vacuum bag.
Figure 3:
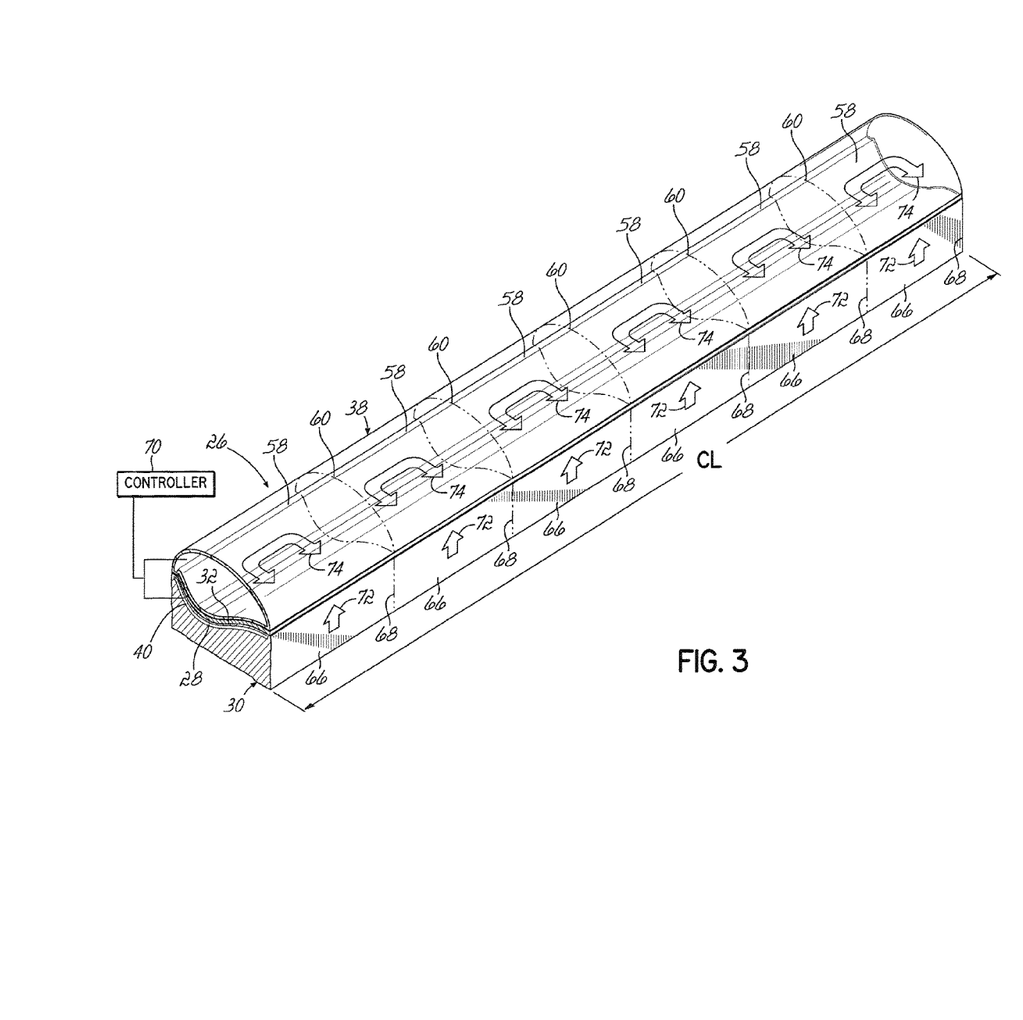
FIG. 3 is a perspective view of the molding apparatus of FIG. 2.
Figure 4:
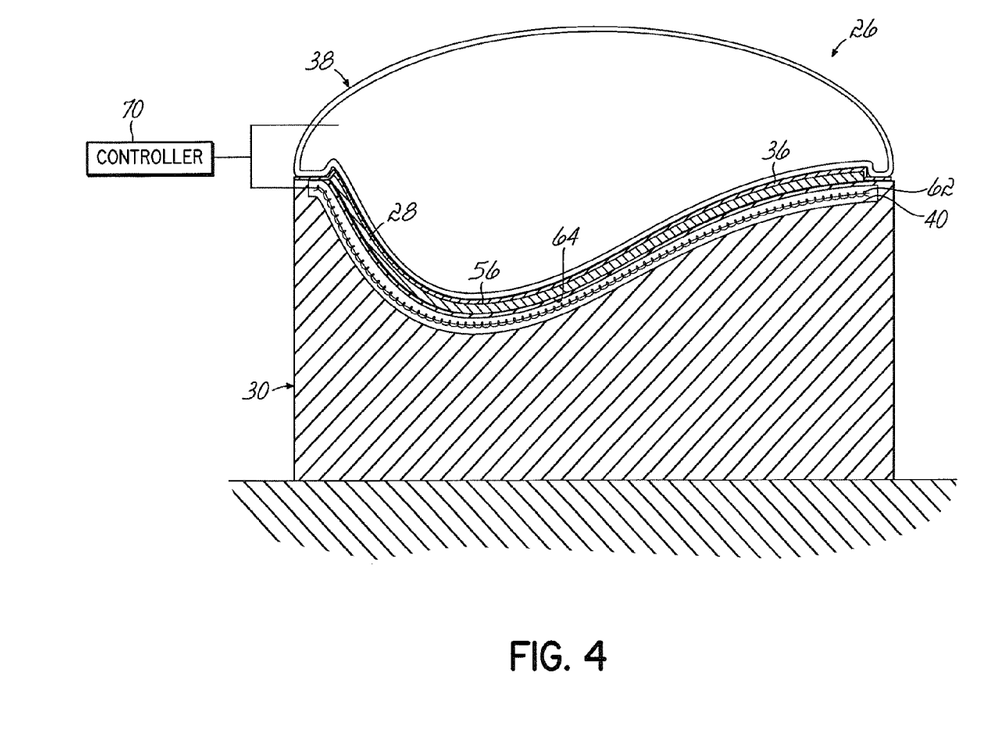
FIG. 4 is a cross-sectional front view of the molding apparatus of FIG. 3 along line 3-3.

As described above, the wind turbine blades 20 are typically formed as multiple components assembled together after curing such as spar caps, spar third webs, and outer airfoil shell halves (hereinafter "blade components"). With reference to FIGS. 2-4, a first embodiment of a molding apparatus 26 is shown for manufacturing a blade component 28. The molding apparatus 26 includes a main mold body 30 having a shape defining surface 32 configured to receive the composite material 34 used to form the blade component 28. Once the composite material 34 is positioned on the shape defining surface 32, a vacuum bag 36 and a flexible bladder 38 are positioned over the composite material 34. As well understood in the blade manufacturing field, the vacuum bag 36 applies vacuum pressure to compress the composite material 34 into final shape for the blade component 28 while removing any excess air or resin from the composite material 34. The flexible bladder 38 overlays and conforms to the shape of the blade component 28. Advantageously, the flexible bladder 38 receives a heated liquid and the main mold body 30 includes a heat reservoir 40. The heated liquid and the heat reservoir 40 collectively heat the blade component 28 from both sides to cure the composite material 34 into the final shape. As described in further detail below, at least one of the main mold body 30 and the flexible bladder 38 is divided into zones along a component length CL so that the temperature is independently controlled in these zones to obtain a generally uniform curing temperature of the blade component 28 along the entire component length CL.

With particular reference to FIG. 2, the lay-up laminate molding process used with the molding apparatus 26 of the current invention is schematically shown. The composite materials 34 for forming the blade component 28 are applied in layers to the shape defining surface 32 of the main mold body 30 either manually or by machine. As described briefly above, the composite materials 34 include one or more fiber materials such as glass fiber, carbon fiber, or other materials along with a resin to hold the fiber materials together. For example, the composite materials 34 may include a plurality of layers of resin pre-impregnated fiber layers 42, separate layers of dry (i.e., resin-free) fiber layers 44 and resin layers 46, or some combination of both pre-impregnated and dry fiber layers 42, 44. In this regard, the composite materials 34 may include all pre-impregnated fiber layers 42, or all dry fiber layers 44, or some combination of both as shown for illustrative purposes in FIG. 3. When dry fiber layers 44 are used, additional resin material may be injected during the molding process into the composite material 34. The composite material 34 may also include other material layers 48 interspersed with the fiber layers 42, 44 for other known purposes (e.g., a metallic conductor used for channeling lightning strikes away from sensitive portions of the final wind turbine blade 20). Additional layers are also possible, including, for example, breather cloth and peel ply. It will be understood that the particular type and ordering of layers of composite materials 34 may be modified without departing from the scope of the current invention.

After the composite material 34 has been laid into position on the shape defining surface 32, the vacuum bag 36 is placed over the composite material 34 and the shape defining surface 32. As shown in FIG. 2, the vacuum bag 36 is secured in place on the main mold body 30 with a securing element 50 such as bag sealant tape. The vacuum bag 36 includes at least one outlet port 52 which is then connected to a vacuum source such as a vacuum pump 54. The vacuum pump 54 applies negative atmospheric pressure to the composite material 34, which removes air and excess resin from the composite material 34 and pulls the vacuum bag 36 tightly onto the composite material 34 and the main mold body 30. In this regard, the vacuum bag 36 and vacuum pump 54 position the composite material 34 in a final shape for curing. The flexible bladder 38 is positioned in an overlaying manner onto the vacuum bag 36 at the composite material 34 as shown in FIG. 2. As described in further detail below, the flexible bladder 38 and main mold body 30 then provide heat onto both sides of the composite material 34 to cure the composite material 34 and form the cured blade component 28. It will be understood that the flexible bladder 38 may be positioned over the composite material 34 either before or after actuation of the vacuum pump 54 depending on the preferences of the manufacturer.

Additional details of the molding apparatus 26 of this embodiment are shown in FIGS. 3 and 4. To this end, the flexible bladder 38 of this embodiment is a unitary bladder extending along substantially the entire component length CL of the blade component 28. The flexible bladder 38 overlays the blade component 28 such that the flexible bladder 38 conforms to the shape of the blade component 28 as shown most clearly in FIG. 4. As a result, the flexible bladder 38 is positioned in close proximity to the entire surface area along an upper side 56 of the blade component 28 as positioned on the main mold body 30. The flexible bladder 38 receives a heated liquid such as heating oil, a water/glycol mixture, or another suitable liquid. The heated liquid enables the flexible bladder 38 to conform to the shape of the blade component 28 as described above. The heated liquid flows over substantially the entire upper side 56 of the blade component 28 and thereby applies heat energy to cure the blade component 28 on the shape defining surface 32. As shown in FIG. 3, the flexible bladder 38 may be optionally divided into a plurality of bladder zones 58 by a plurality of thermally insulating partitions 60 positioned in series along the component length CL (another embodiment similar to this arrangement is described with reference to FIG. 5 below). Regardless of whether the flexible bladder 38 in completely unitary or divided into the plurality of bladder zones 58, the heated liquid is continuously provided to the entire flexible bladder 38 during the curing process.

The main mold body 30 is also further illustrated in FIGS. 3 and 4. The main mold body 30 includes the heat reservoir 40, which may include an electric heating device 62 such as a heating coil positioned in close proximity to the shape defining surface 32. Consequently, the electric heating device 62 is operable to apply heat energy to a lower side 64 of the blade component 28 along substantially the entire component length CL. The heated liquid within the flexible bladder 38 and the electric heating device 62 in the heat reservoir 40 of the main mold body 30 collectively heat the blade component 28 along upper and lower sides 56, 64 to provide substantially uniform heating through the thickness and along the component length CL of the blade component 28. Similar to the flexible bladder 38, the main mold body 30 may be optionally divided into a plurality of mold body zones 66 by a plurality of thermally insulating partitions 68 located in series along the component length CL. In such embodiments with a plurality of mold body zones 66, each mold body zone 66 includes a heat reservoir 40 and an electric heating device 62 for heating the localized region of the blade component 28 at that mold body zone 66. It will be understood that one or both of the main mold body 30 and the flexible bladder 38 may be divided into zones according to various embodiments of the current invention.

In order to ensure that the curing temperature applied to the blade component 28 is generally uniform along the component length CL, the molding apparatus 26 of this embodiment also includes a controller 70 schematically shown in FIGS. 3 and 4. The controller 70 receives sensed temperatures from various positions along the blade component 28 and adjusts the flow of heating liquid in the flexible bladder 38 and/or the electrical power supplied to the electric heating device(s) 62 to maintain the desired uniform temperature. It will be understood that a generally uniform temperature according to this invention means a constant temperature plus or minus 2° C. throughout the thickness and component length CL. When the flexible bladder 38 and/or the main mold body 30 are divided into corresponding bladder zones 58 and/or mold body zones 66, the controller 70 adjusts the heat energy applied by each respective zone 58, 66 to independently control the temperature of the blade component 28 at each zone 58, 66. Each of the bladder zones 58 is shown in FIG. 3 positioned at a common location along the component length CL with a corresponding mold body zone 66, although it will be appreciated that the bladder zones 58 and mold body zones 66 may be positioned at differing locations along the component length CL in other embodiments consistent with the scope of the current invention.

In one particular example of the first embodiment of the molding apparatus 26, the flexible bladder 38 is a unitary bladder while the main mold body 30 is divided into the mold body zones 66. In this regard, the controller 70 separately controls the electrical power supplied to the electrical heating devices 62 in each heat reservoir 40 of the mold body zones 66 to heat the lower side 64 of the blade component 28 as indicated by arrows 72 in FIG. 3. The controller 70 can receive a sensed temperature adjacent each of the mold body zones 66 to determine how to adjust the electrical power at each electrical heating device 62 to correct for any discrepancies in temperature across the component length CL. Although the mold body zones 66 are thermally isolated from each other, heat energy may be advantageously transferred throughout various sections of the blade component 28 and also by the heated liquid within the flexible bladder 38. This lengthwise transfer of heat energy and application of heat energy to the upper side 56 of the blade component 28 by the heated liquid is indicated by arrows 74 in FIG. 3. Accordingly, the blade component 28 is advantageously heated in a uniform manner during curing along the upper and lower sides 56, 64 to reduce the likelihood of any air bubbles being trapped within the composite material 34.

Figure 5:
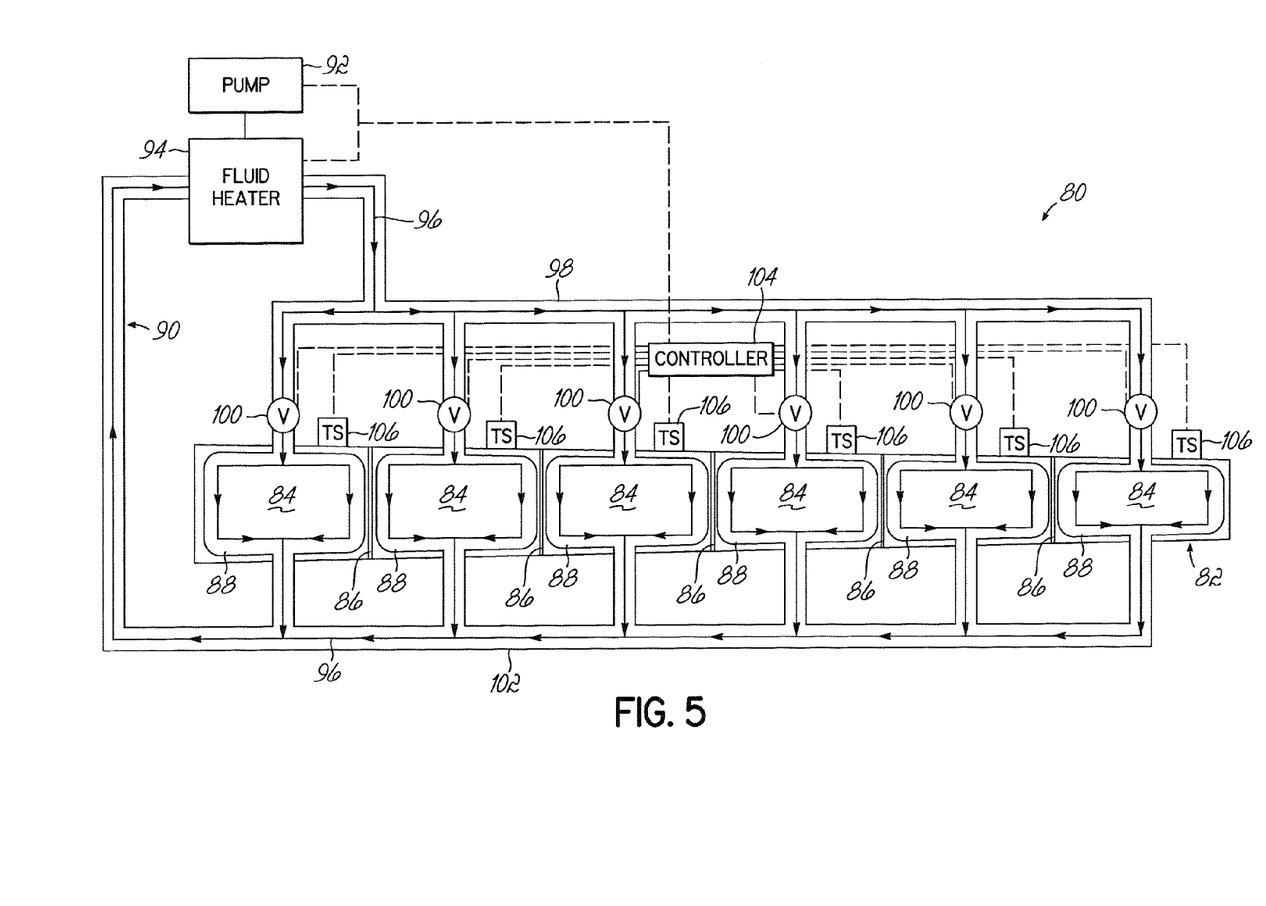
FIG. 5 is a schematic flow diagram of a second embodiment of the molding apparatus used to manufacture a blade component, showing flow of heated fluid through mold body zones.
Figure 6:
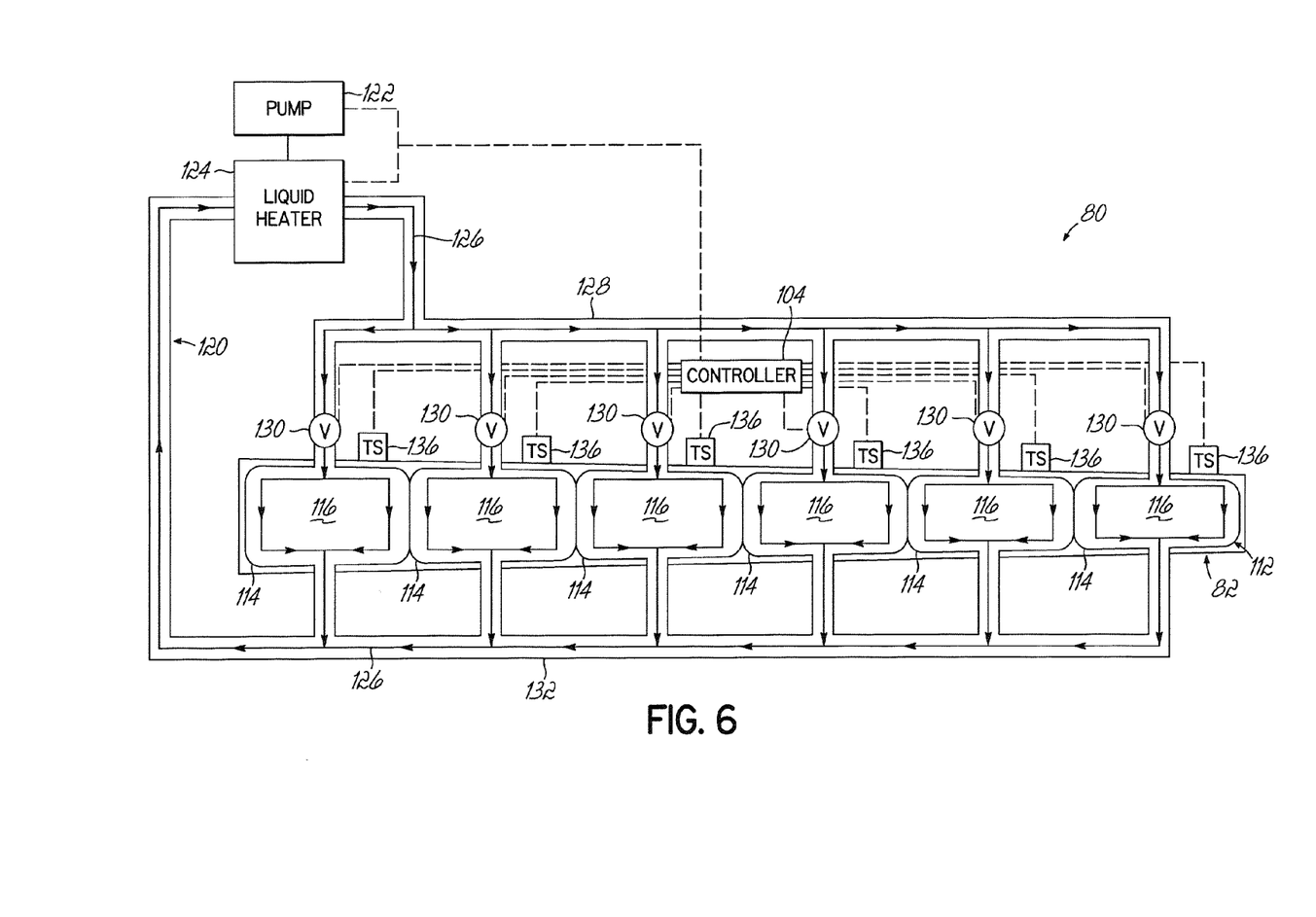
FIG. 6 is a schematic flow diagram of the molding apparatus of FIG. 2, showing flow of heated liquid through bladder zones.

With reference to FIGS. 5 and 6, another embodiment of a molding apparatus 80 for manufacturing a wind turbine blade component 28 is shown schematically. The molding apparatus 80 of this embodiment is similar to the previously-described first embodiment, so the following description focuses on only the differences present in this embodiment. With particular reference to FIG. 5, the molding apparatus 80 includes a main mold body 82 divided into a plurality of mold body zones 84 thermally isolated from one another by thermally insulating partitions 86. Each of the mold body zones 84 includes a heat reservoir 88, which in this embodiment is a vessel 88 configured to receive a heated fluid. For example, the heated fluid received by each vessel 88 may be a heated gas such as air or may be a heated liquid such as heating oil or a water/glycol mixture. The vessel 88 extends along substantially all of the surface area of the shape defining surface (not shown) in the particular mold body zone 84 such that the heated fluid can uniformly spread and apply heat energy to the lower side of the blade component 28. Although the vessel 88 is shown as a separate compartment within the mold body zone 84 in FIG. 5, it will be understood that the vessel 88 may be defined by the structural walls of the main mold body 82 in other embodiments consistent with the current invention.

In order to supply the mold body zones 84 with a continuous supply of the heated fluid, the molding apparatus 80 of this embodiment includes a heated fluid recirculation circuit 90 as shown in FIG. 5. The recirculation circuit 90 includes a pump 92 and a fluid heater 94 for generating a supply of the heated fluid. The pump 92 delivers heated fluid as shown by flow arrows 96 through a plurality of supply passages 98 leading into each vessel 88. The supply passages 98 may include corresponding flow control valves 100 for purposes described in further detail below. After entering the vessels 88, the heated fluid flows within the vessels 88 and eventually exits through a plurality of return passages 102 leading back to the pump 92 and fluid heater 94. Thus, as heat energy is continuously removed from the heated fluid at the mold body zones 84, the supply of freshly heated fluid is replenished in the vessels 88 to maintain the generally uniform temperature of the blade component 28 along the component length CL. Although the pump 92 and fluid heater 94 are schematically shown in FIG. 5 to be outside the main mold body 82, it will be understood that the pump 92 and/or the fluid heater 94 may be positioned within a portion of the main mold body 82 in other embodiments of the current invention.

Similar to the previous embodiment, the molding apparatus 80 of this embodiment includes a controller 104 for independently controlling the temperature of the blade component 28 at each mold body zone 84. The controller 104 is operatively coupled to the pump 92 and fluid heater 94 and may actuate the fluid heater 94 to adjust the temperature of the heated fluid delivered to the vessels 88. Additionally, the molding apparatus 80 includes a first plurality of temperature sensors 106 thermally coupled to the mold body zones 84 for sensing the temperature at each mold body zone 84. The first plurality of temperature sensors 106 is operatively connected to the controller 104 so that the temperature sensors 106 communicate these temperatures of the mold body zones 84 to the controller 104. The controller 104 can then determine if there is any temperature discrepancy between any of the mold body zones 84. The controller 104 is also operatively connected to each of the flow control valves 100. Thus, if any discrepancy in temperature is detected by the temperature sensors 106, the controller 104 actuates the flow control valves 100 to adjust the flow rate of heated fluid in the necessary mold body zones 84. For example, if one of the mold body zones 84 drops in temperature outside the desired uniform curing temperature of the other mold body zones 84, then the corresponding flow control valve 100 of that mold body zone 84 is opened more to allow for a higher flow of heated fluid through the vessel 88 of that mold body zone 84 to correct the temperature discrepancy. Consequently, the controller 104 operates the flow control valves 100 in accordance with temperatures sensed by the first plurality of temperature sensors 106 to independently control the heat energy delivered at each mold body zone 84. Alternatively or in addition, it will be understood that the controller 104 may adjust the temperature of the heated fluid produced by the fluid heater 94 to control the heat energy delivered at each mold body zone 84. As a result, a uniform curing temperature may be maintained along the entire component length CL of the blade component 28 by the main mold body 82.

Turning to FIG. 6, the molding apparatus 80 of this embodiment also includes a flexible bladder 112 for overlaying and conforming to an upper side of the blade component 28 on the main mold body 82. The flexible bladder 112 includes a plurality of independent flexible bladders 114 so as to divide the flexible bladder 112 into a plurality of bladder zones 116. It will be understood that the plurality of bladder zones 116 may be thermally isolated from one another in some embodiments (such as by having the plurality of independent flexible bladders 114 not in contact with one another). Each of the bladder zones 116 is configured to receive a heated liquid. For example, the heated liquid received by each bladder zone 116 may be heating oil or a water/glycol mixture. The independent flexible bladder 114 extends along substantially all of the surface area of the shape defining surface (not shown) in the particular bladder zone 116 such that the heated fluid can uniformly spread and apply heat energy to the upper side of the blade component 28.

In order to supply the bladder zones 116 with a continuous supply of the heated liquid, the molding apparatus 80 of this embodiment includes a heated liquid recirculation circuit 120 as shown in FIG. 6. The recirculation circuit 120 includes a pump 122 and a liquid heater 124 for generating a supply of the heated liquid. The controller 104 is operatively coupled to the pump 122 and liquid heater 124 and may actuate the liquid heater 124 to adjust the temperature of the heated liquid delivered to the bladder zones 116. The pump 122 delivers heated liquid as shown by flow arrows 126 through a plurality of supply passages 128 leading into each bladder zone 116. The supply passages 128 may include corresponding flow control valves 130 for purposes described in further detail below. After entering the bladder zones 116, the heated liquid flows within the bladder zones 116 and eventually exits through a plurality of return passages 132 leading back to the pump 122 and liquid heater 124. Thus, as heat energy is continuously removed from the heated liquid at the bladder zones 116, the supply of freshly heated liquid is replenished in the bladder zones 116 to maintain the generally uniform temperature of the blade component 28 along the component length CL. Although the pump 122 and liquid heater 124 are schematically shown in FIG. 5 to be outside the main mold body 82, it will be understood that the pump 122 and/or the liquid heater 124 may be positioned within a portion of the main mold body 82 in other embodiments of the current invention.

Additionally, the molding apparatus 80 includes a second plurality of temperature sensors 136 thermally coupled to the bladder zones 116 for sensing the temperature at each bladder zone 116. The second plurality of temperature sensors 136 is operatively connected to the controller 104 so that the temperature sensors 136 communicate these temperatures of the bladder zones 116 to the controller 104. The controller 104 can then determine if there is any temperature discrepancy between any of the bladder zones 116. The controller 104 is also operatively connected to each of the flow control valves 130. Thus, if any discrepancy in temperature is detected by the temperature sensors 136, the controller 104 actuates the flow control valves 130 to adjust the flow rate of heated liquid in the necessary bladder zones 116. For example, if one of the bladder zones 116 drops in temperature outside the desired uniform curing temperature of the other bladder zones 116, then the corresponding flow control valve 130 of that bladder zone 116 is opened more to allow for a higher flow of heated liquid through the bladder zone 116 to correct the temperature discrepancy. Consequently, the controller 104 operates the flow control valves 130 in accordance with temperatures sensed by the second plurality of temperature sensors 136 to independently control the heat energy delivered at each bladder zone 116. Alternatively or in addition, it will be understood that the controller 104 may adjust the temperature of the heated liquid produced by the liquid heater 124 to control the heat energy delivered at each bladder zone 116. As a result, a more uniform curing temperature may be maintained along the entire component length CL of the blade component 28 by the flexible bladder 112. Although six mold body zones 84 and bladder zones 116 are shown in FIGS. 5 and 6, it will be understood that more or fewer zones 84, 116 of one or both types may be provided to optimize heat distribution in other embodiments consistent with the invention.

The controller 104 of the molding apparatus 80 is therefore operable to modify the heat energy applied at various zones on both the upper and lower sides of the blade component 28. Advantageously, this independent control enables more reliable generation of a substantially uniform curing temperature along the entire thickness and component length CL of the blade component 28. Accordingly, the trapping of air bubbles or other inconsistencies within the final blade component 28 are reduced or minimized, which thereby increases the expected life of the blade component 28. Furthermore, the use of the flexible bladder 112 enables complete manufacturing of blade components 28 without requiring movement of an uncured composite material 34 or the molding equipment.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. For example, if the curing temperature of a blade component 28 is to be modified so as to be different in different zones of the blade component 28, the molding apparatuses 26, 80 of the current invention can independently control the temperature of the blade component 28 accordingly in each zone. Additionally, multiple pumps and fluid heaters may be provided in each fluid recirculation circuit in these embodiments to produce separate heated fluid/liquid temperature set points to supply to the different zones. The invention in its broader aspects is therefore not limited to the specific details, representative methods, and illustrative examples shown and described. Accordingly, departures may be made from such details without departing from the spirit or scope of the general inventive concept.

The invention and embodiments thereof can be summarized in the following clauses:

C1. A molding apparatus for manufacturing a wind turbine blade component having a component length, the molding apparatus comprising:

a main mold body including a shape defining surface configured to receive composite material forming the blade component, the main mold body being divided along the component length into a plurality of mold body zones, each mold body zone including a heat reservoir configured to heat the blade component at that mold body zone;

a flexible bladder configured to overlay the blade component on the shape defining surface and conform to a shape of the blade component, the flexible bladder receiving a heated liquid for heating the blade component; and a controller operatively coupled to the main mold body for independently controlling the temperature of the blade component at each mold body zone.

C2. The molding apparatus according to clause C1, further comprising:

a first plurality of temperature sensors operatively coupled to the controller and thermally coupled to the plurality of mold body zones for sensing the temperature of each mold body zone and communicating these temperatures to the controller.

C3. The molding apparatus according to clause C1 or C2, wherein each of the heat reservoirs in the mold body zones includes a vessel for receiving a heated fluid, and the apparatus further comprises:

a fluid pump for pumping the heated fluid to each of the vessels of the heat reservoirs; and a flow control valve associated with each of the mold body zones and operatively coupled to the controller, the flow control valves operated by the controller to adjust a flow rate of the heated fluid received in the corresponding vessels from the fluid pump.

C4. The molding apparatus according to any of the preceding clauses, wherein the flexible bladder is divided along the component length into a plurality of bladder zones.

C5. The molding apparatus according to clause C4, wherein the flexible bladder includes a unitary bladder divided into the plurality of bladder zones by a plurality of partitions within the unitary bladder.

C6. The molding apparatus according to clause C4, wherein the flexible bladder comprises a plurality of independent flexible bladders each defining one of the plurality of bladder zones.

C7. The molding apparatus according to any of clauses C4-C6, wherein each of the plurality of bladder zones is positioned at a common location along the component length with a corresponding one of the plurality of mold body zones.

C8. The molding apparatus according to any of clauses C4-C7, further comprising:

a second plurality of temperature sensors operatively coupled to the controller and thermally coupled to the plurality of bladder zones for sensing the temperature of each bladder zone and communicating these temperatures to the controller.

C9. The molding apparatus according to any of clauses C4-C8, further comprising:

a liquid pump for pumping the heated liquid to each of the bladder zones; and a flow control valve associated with each of the bladder zones and operatively coupled to the controller, the flow control valves operated by the controller to adjust a flow rate of the heated liquid received in the corresponding bladder zone from the liquid pump.

C10. The molding apparatus according to any of the preceding clauses, wherein each of the mold body zones and the flexible bladder are heated by heating oil or a water/glycol mixture.

C11. The molding apparatus according to clause C1, wherein each of the heat reservoirs in the mold body zones includes an electric heating device for heating the blade component, and wherein the flexible bladder includes a unitary bladder receiving heating oil, the unitary bladder transferring heat energy from the heating oil and each of the electric heating devices along the component length.

C12. The molding apparatus according to any of the preceding clauses, wherein the plurality of mold body zones are thermally isolated from one another.

C13. The molding apparatus according to any of the preceding clauses, further comprising:

a liquid heater configured to heat the heated liquid to be supplied to the flexible bladder, the liquid heater being operatively coupled to the controller such that the controller actuates the liquid heater to control a temperature of the heated liquid and thereby control the temperature of the blade component.

C14. A method for manufacturing a wind turbine blade component having a component length, the method comprising:

laying composite material onto a shape defining surface of a main mold body that is divided along the component length into a plurality of mold body zones;

positioning a flexible bladder to overlay and conform to the composite material on the shape defining surface;

curing the composite material by supplying heated liquid to the flexible bladder and by supplying heat energy from heat reservoirs located in each of the mold body zones; and controlling the temperature of the composite material at each of the mold body zones independently.

C15. The method according to clause C14, further comprising:

sensing the temperature of each heat reservoir; and controlling the heat energy supplied to each heat reservoir to maintain a generally uniform temperature across each of the mold body zones.

C16. The method according to clause C15, wherein each of the heat reservoirs in the mold body zones includes an electric heating device, and controlling the heat energy supplied to each heat reservoir further comprises:

modifying electrical power supplied to each electric heating device depending on the sensed temperatures of the heat reservoirs.

C17. The method according to clause C15, wherein each of the heat reservoirs in the mold body zones includes a vessel for receiving heated fluid, and controlling the heat energy supplied to each heat reservoir further comprises:

modifying a flow rate of the heated fluid delivered to each heat reservoir depending on the sensed temperatures of the heat reservoirs.

C18. The method according to any of clauses C14-C17, wherein the flexible bladder is divided along the component length into a plurality of bladder zones, and curing the composite material further comprises:

supplying heated liquid to each of the plurality of bladder zones independently.

C19. The method according to clauses C18, further comprising:

sensing the temperature of each bladder zone; and controlling a flow rate of the heated liquid supplied to each bladder zone to maintain a generally uniform temperature across each of the bladder zones.

C20. The method according to clause C19, wherein each of the plurality of bladder zones is positioned at a common location along the component length with a corresponding one of the plurality of mold body zones, and controlling the temperature of the composite material at each of the mold body zones further comprises:
controlling the temperature of all of the mold body zones and all of the bladder zones to be generally uniform.

C21. The method according to clause C14, wherein each of the heat reservoirs in the mold body zones includes an electric heating device for heating the blade component, the flexible bladder includes a unitary bladder receiving heating oil, and the method further comprises:
transferring heat energy from the heating oil and each of the electric heating devices along the component length through the unitary bladder.

C22. A molding apparatus for manufacturing a wind turbine blade component having a component length, the molding apparatus comprising:
a main mold body including a shape defining surface configured to receive composite material forming the blade component;
a flexible bladder configured to overlay the blade component on the shape defining surface and conform to a shape of the blade component, the flexible bladder being divided along the component length into a plurality of bladder zones each receiving a heated liquid for heating the blade component; and
a controller operatively coupled to the flexible bladder for independently controlling the temperature of the blade component at each bladder zone.

C23. The molding apparatus according to clause C22, wherein the main mold body includes a heat reservoir configured to heat the blade component such that the blade component is heated from all sides.

C24. The molding apparatus according to one of clauses C22 or C23, further comprising:
a liquid heater configured to heat the heated liquid to be supplied to the flexible bladder, the liquid heater being operatively coupled to the controller such that the controller actuates the liquid heater to control a temperature of the heated liquid and thereby control the temperature of the blade component.

The invention claimed is:

1. A molding apparatus for manufacturing a wind turbine blade component having a component length, the molding apparatus comprising:
a main mold body including a shape defining surface configured to receive composite material forming the blade component, the main mold body being divided in series along the component length into a plurality of mold body zones, each mold body zone including a heat reservoir configured to heat the blade component at that mold body zone, and the plurality of mold body zones being thermally isolated from one another by partitions;
a flexible bladder configured to overlay the blade component on the shape defining surface and conform to a shape of the blade component, the flexible bladder receiving a heated liquid for heating the blade component; and
a controller operatively coupled to the main mold body for independently controlling the temperature of the blade component at each mold body zone.

2. The molding apparatus according to claim 1, further comprising:
a first plurality of temperature sensors operatively coupled to the controller and thermally coupled to the plurality of mold body zones for sensing the temperature of each mold body zone and communicating these temperatures to the controller.

3. The molding apparatus according to claim 1, wherein each of the heat reservoirs in the mold body zones includes a vessel for receiving a heated fluid, and the apparatus further comprises:
a fluid pump for pumping the heated fluid to each of the vessels of the heat reservoirs; and
a flow control valve associated with each of the mold body zones and operatively coupled to the controller, the flow control valves operated by the controller to adjust a flow rate of the heated fluid received in the corresponding vessels from the fluid pump.

4. The molding apparatus according to claim 1, wherein the flexible bladder is divided along the component length into a plurality of bladder zones.

5. The molding apparatus according to claim 4, wherein each of the plurality of bladder zones is positioned at a common location along the component length with a corresponding one of the plurality of mold body zones.

6. The molding apparatus according to claim 4, further comprising:
a second plurality of temperature sensors operatively coupled to the controller and thermally coupled to the plurality of bladder zones for sensing the temperature of each bladder zone and communicating these temperatures to the controller.

7. The molding apparatus according to claim 4, further comprising:
a liquid pump for pumping the heated liquid to each of the bladder zones; and
a flow control valve associated with each of the bladder zones and operatively coupled to the controller, the flow control valves operated by the controller to adjust a flow rate of the heated liquid received in the corresponding bladder zone from the liquid pump.

8. The molding apparatus according to claim 1, wherein each of the heat reservoirs in the mold body zones includes an electric heating device for heating the blade component, and wherein the flexible bladder includes a unitary bladder receiving heating liquid, the unitary bladder transferring heat energy from the heating liquid and each of the electric heating devices along the component length.

9. A method for manufacturing a wind turbine blade component having a component length, the method comprising:
laying composite material onto a shape defining surface of a main mold body that is divided in series along the component length into a plurality of mold body zones, wherein the plurality of mold body zones are thermally isolated from one another by partitions;
positioning a flexible bladder to overlay and conform to the composite material on the shape defining surface;
curing the composite material by supplying heated liquid to the flexible bladder and by supplying heat energy from heat reservoirs located in each of the mold body zones; and
controlling the temperature of the composite material at each of the mold body zones independently.

10. The method according to claim 9, further comprising:
sensing the temperature of each heat reservoir; and controlling the heat energy supplied to each heat reservoir to maintain a generally uniform temperature across each of the mold body zones.

11. The method according to claim 9, wherein the flexible bladder is divided in series along the component length into a plurality of bladder zones, and curing the composite material further comprises:
supplying heated liquid to each of the plurality of bladder zones independently.

12. The method according to claim 9, wherein each of the heat reservoirs in the mold body zones includes an electric heating device for heating the blade component, the flexible bladder includes a unitary bladder receiving heating oil, and the method further comprises:
transferring heat energy from the heating oil and each of the electric heating devices along the component length through the unitary bladder.

\* \* \* \* \*